ELTON L. TOWLE
OSCAR H. DORER
INVENTORS

ELTON L. TOWLE
OSCAR H. DORER
*INVENTORS*

ELTON L. TOWLE
OSCAR H. DORER
INVENTOR.

ELTON L. TOWLE
OSCAR H. DORER
INVENTORS

Feb. 7, 1956 E. L. TOWLE ET AL 2,733,660
AUTOMATIC VARIABLE SPEED CONTROL
MECHANISM FOR FLUID PUMPS
Filed Aug. 30, 1952 8 Sheets-Sheet 5

ELTON L. TOWLE
OSCAR H. DORER
INVENTORS

BY *Robert Meyer*
  *attorney*

ELTON L. TOWLE
OSCAR H. DORER
INVENTORS

ELTON L. TOWLE
OSCAR H. DORER
INVENTORS

ELTON L. TOWLE
OSCAR H. DORER
INVENTORS

United States Patent Office 2,733,660
Patented Feb. 7, 1956

2,733,660

AUTOMATIC VARIABLE SPEED CONTROL MECHANISM FOR FLUID PUMPS

Elton L. Towle, Glen Rock, and Oscar H. Dorer, East Orange, N. J., assignors to Worthington Corporation, Harrison, N. J., a corporation of Delaware Application August 30, 1952, Serial No. 307,202

23 Claims. (Cl. 103—23)

This invention relates to fluid pumping units and more particularly to a mechanism for automatically varying the speed of operation of a centrifugal pump in accordance with variations in the level of the fluid being pumped, and to cut in and out of operation one or more pumps in a pumping system as conditions of pumping fluid requires.

The present invention is particularly adaptable for use in connection with pumps where the quantity of fluid to be pumped varies widely over predetermined periods of time, such as in sewage systems wherein the sewage flow varies widely over the average day, and particularly such systems where storm water and sanitary sewage are handled in the same system.

Where storm water and sanitary sewage are handled in the same system, the maximum flows will be increased quite materially, necessitating more, or larger pumping units than if the station handled sanitary sewage only. It is impractical, expensive, and costly as to power consumption to operate all the pumps in such a system, or to operate one or more of them at maximum speed and capacity when the sewage flow does not require such pumping capacity.

It is an object of the present invention to provide automatic stepless speed control of a pump or pumps to conform to changes in the quantities of fluid to be pumped, and means whereby the speed change is accomplished in a smooth line pattern over the entire speed range and not in "jumps" or steps and whereby the speed is changed only with sustained fluid level changes which precludes "hunting" and surges of the mechanism with the resulting "jumps" or quick and unwarranted changes or variations in the speed of operation of the pump or pumps, and eliminates frequent starting and stopping of the motors which drive the pumps, and also to provide mechanism for providing such control which embodies a minimum number of parts and simple reduction of motion of change or variation of water level with minimum friction.

More specifically, the present invention comprehends means whereby the speed of a pump or pumps may be varied to meet predetermined pumping conditions independently of variations in the speed of the electric motor driving the pump or pumps thereby allowing the motor or motors to run at constant speed, and the speed changes as the speed of the pump or pumps is increased or decreased reflect more or less motor load. Such control permits the use of synchronous motors with their high efficiencies, power factors, and power factor correction.

Another object of the present invention is to provide a speed control mechanism used in connection with a pumping unit embodying a centrifugal pump, driving motor, and a magnetic drive connecting the motor and pump, which control mechanism will control the flow of electric current to the ring of the magnetic drive, in accordance with sustained variations in the level of the liquid to be pumped and by so doing will vary the running speed, or speed of operation of the pump, without variation of the running speed of the driving motor.

With these and objects in view, as may appear from the accompanying specification, the invention consists of various features of construction and combination of parts, which will be first described in connection with the accompanying drawings, showing an automatic variable speed control mechanism for fluid pumps of a preferred form embodying the invention, and the features forming the invention will be specifically pointed out in the claims.

Figure 1:
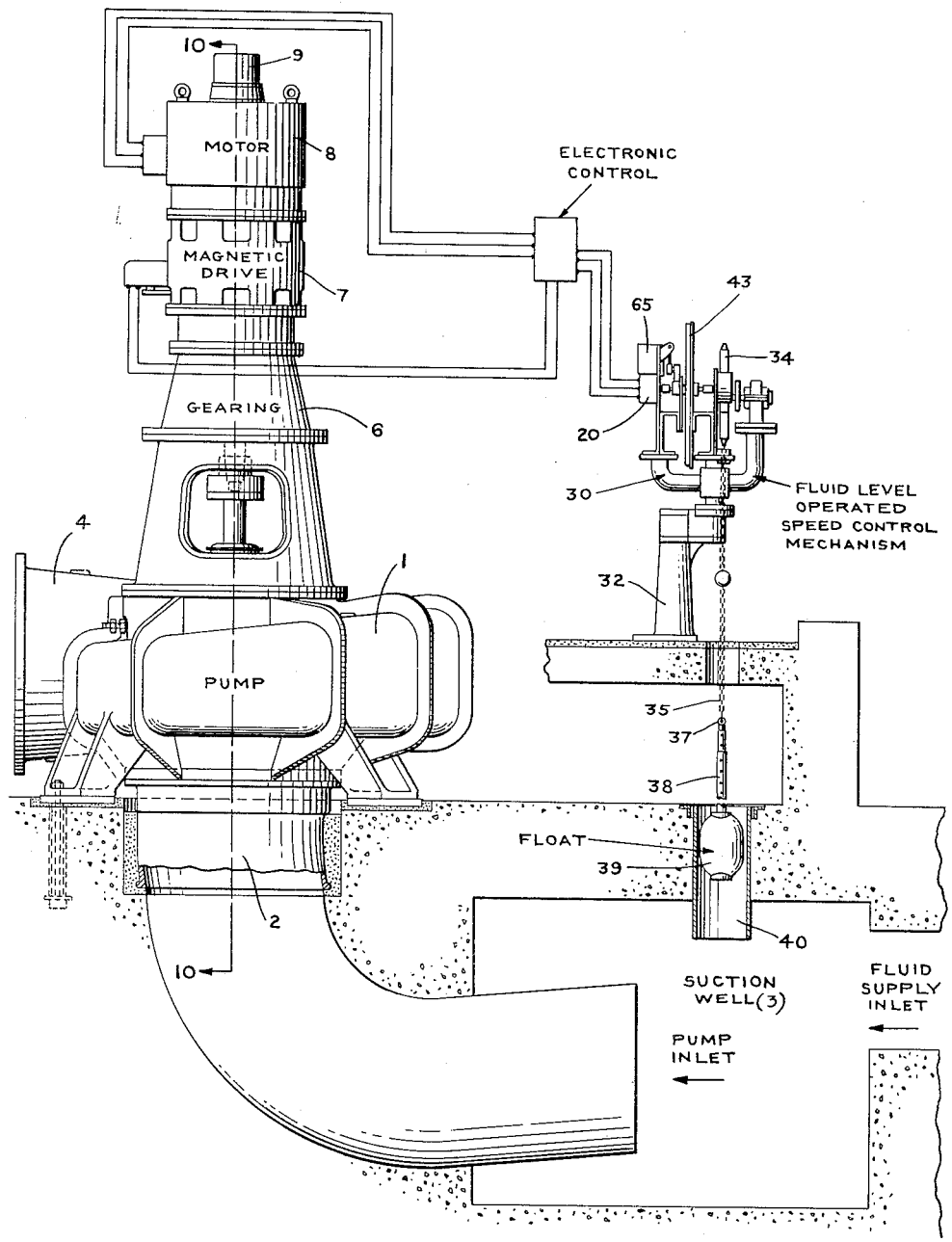
Figure 1 is a diagrammatic view of a pumping unit showing the present invention embodied therein.
Figures 2, 3:
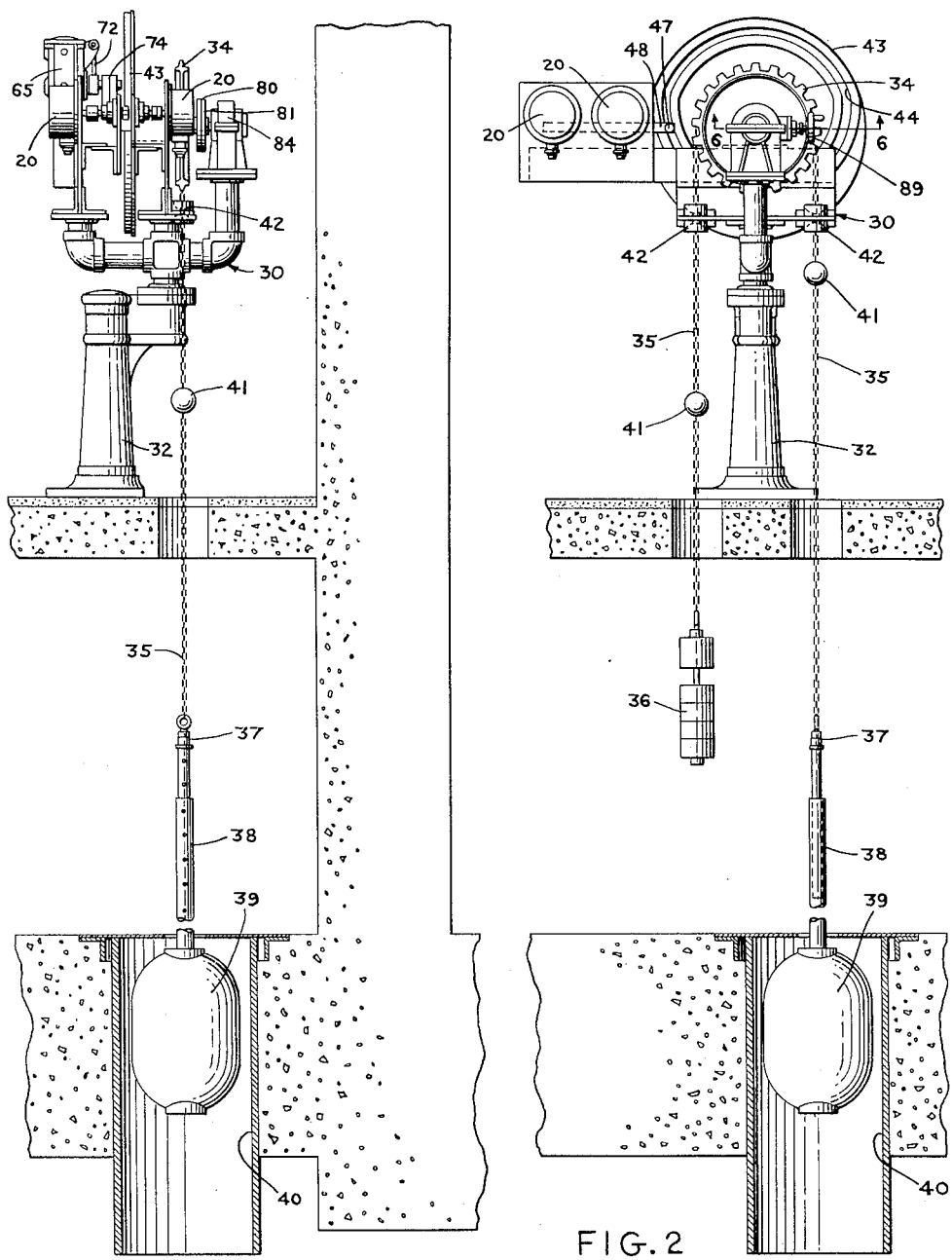
Figure 2 is a side elevation of the speed control mechanism.
Figure 3 is an edge elevation of the speed control mechanism.
Figure 4:
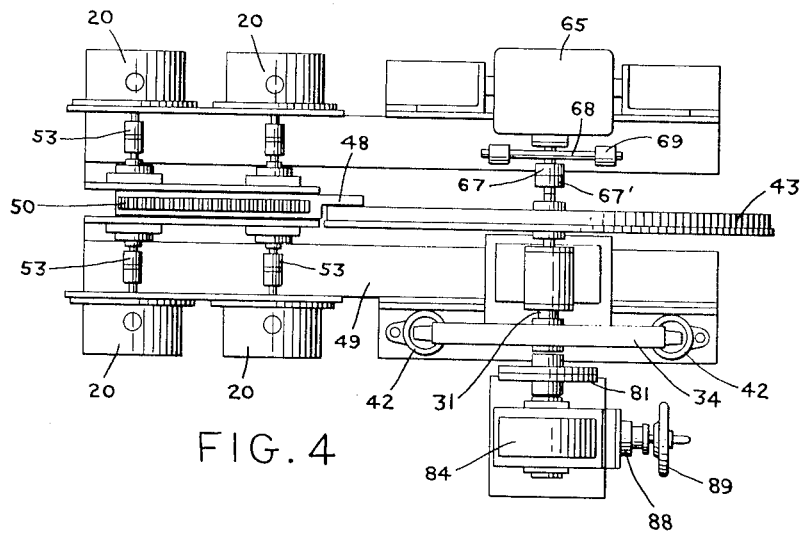
Figure 4 is a top plan view of the speed control mechanism.

Figure 1 of the drawings illustrates a pumping system embodying the present invention, wherein the pump 1, which may be of any approved type of centrifugal pump applicable for use in the pumping conditions to be met has its suction 2 connected to a source of liquid to be pumped (not shown), in the present instance through a suction well 3. The pump 1 discharges through its discharge outlet 4 to any suitable point of discharge. The driving shaft 5 of the pump 1 is connected through any suitable gearing 6 with a magnetic drive 7 which is in turn driven by an electric motor 8. The motor 8 has an ordinary starting motor 9 associated therewith.

The magnetic drive 7 is an adjustable speed magnetic drive, in effect embodying the principle of "fluid drive," except that an electrical field is employed instead of fluid.

Figure 10:
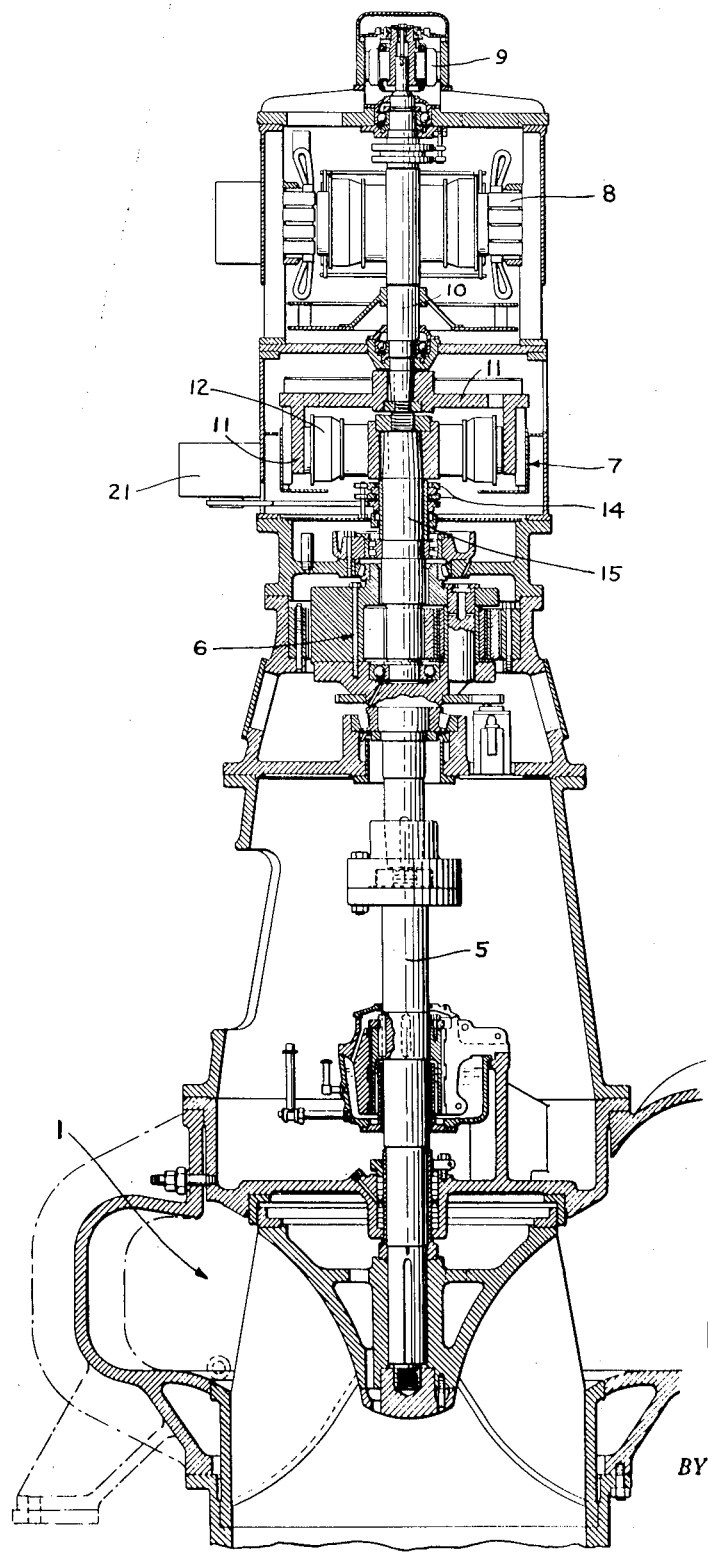
Figure 10 is a vertical section through a pumping unit with which the speed control mechanism is employed and taken on line 10—10 of Figure 1.
Figure 11:
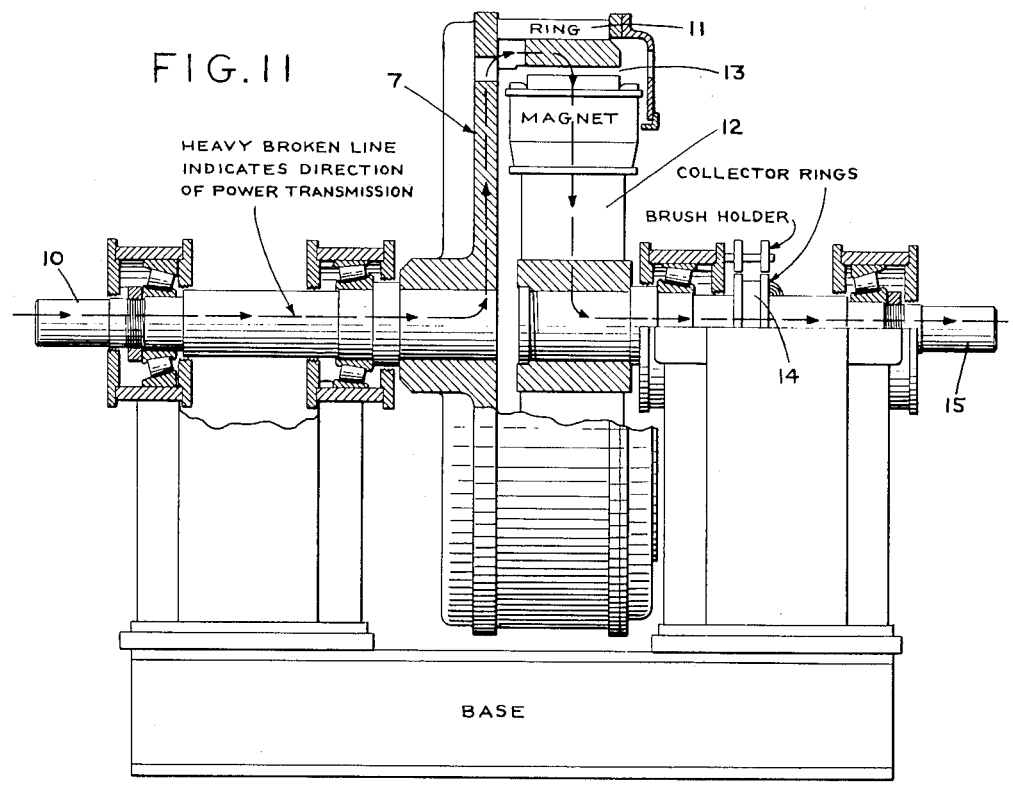
Figure 11 is a diagrammatic cross section of the magnetic drive embodied in the pumping unit.

The magnetic drive 7 is shown diagrammatically in Figure 11 of the drawings, and consists of a driving shaft 10 which is connected to a prime mover, in the present application as shown in Figures 1 and 10 of the drawings, to an electric motor 8. The shaft 10 carries a ring 11, within which rotates a magnet 12 separated from the ring 11 by an air gap shown at 13. The magnet 12 is mounted on the driven shaft 14, which in the illustration shown in Figures 1 and 10 of the drawings is connected through the gearing 6 to the driving shaft 5 of the pump 1.

In operation, the ring 11 revolves at the same speed as the driving motor 8. The magnet 12 is free to revolve within the ring 11, being separated from the ring 11 by the air gap 13. The poles of the magnet 12 are energized or excited by direct current through collector rings 14 on the shaft 15.

The difference in speed between the ring 11 and magnet 12 results in a cutting, by the ring 11, of the magnetic flux produced by the magnet. This induces currents in the ring 11. These induced currents in the ring 11 produce poles in the ring, which react and drag around the poles of the magnet 12, thus causing the magnet to revolve.

The torque is transmitted magnetically through the air gap 13 and the amount of torque is varied precisely and gradually by varying the excitation of the magnet 12. This is the means of varying the speed of rotation of the magnet 12, and in the structure shown in Figures 1 and 10 of the drawings is the means of varying the speed of operation of the pump 1.

Figure 12:
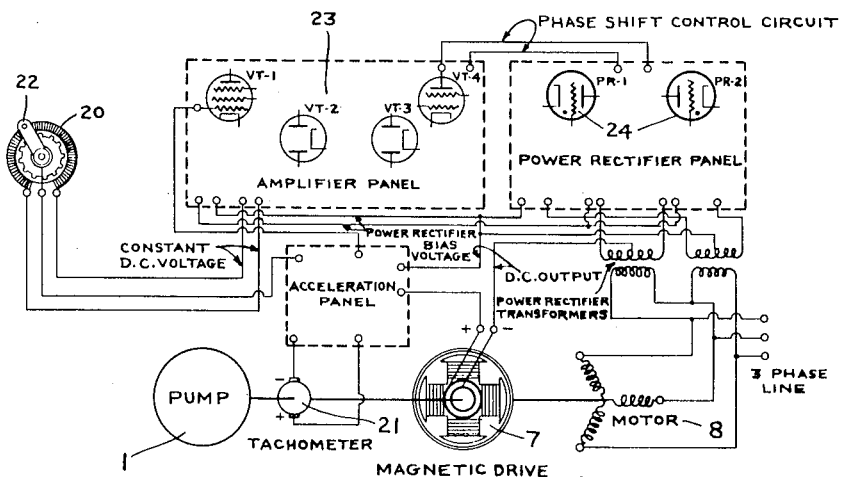
Figure 12 is a diagrammatic representation of one type of electronic controller for controlling operation of the magnetic drive.

Accurate automatic speed control is provided through the use of a three-phase rectifier or electronic control (shown diagrammatically in Figure 12 of the drawings) and is varied by a potentiometer rheostat 20 which controls the electronic tube output, to maintain, with stability and accuracy, the adjustable speed requirements.

Output of a small tachometer generator 21 driven from the shaft 15 actuates the electronic control (shown diagrammatically in Figure 12 of the drawings) to hold operating speed accurately at selected speed. Speed of the pump is selected by positioning the arm 22 of the potentiometer rheostat 20 by operation of the liquid level operated control mechanism shown in Figures 2 to 9 inclusive of the drawings in the manner hereinafter specifically described.

The potentiometer rheostat 20 is balanced electrically against the speed-control tachometer 21 (Figure 12), and operates through an amplifier circuit, indicated at 23 to regulate the output of the power rectifier tubes 24 to supply excitation for the required speed of the magnetic drive 7.

The electronic control in connection with the magnetic drive will provide adjustable, pre-selected speed of the shaft 15, and consequently of the pump 1, and in combination with the liquid level operated automatic speed control mechanism 30 (generically shown in Figure 1 and specifically in Figures 2 to 9 of the drawings) will provide control of the speed of operation of the pump 1 in substantially stepless speed variations, the "steps" in speed variation being so small as to be unnoticeable.

The magnetic drive and electronic control therefor are purchasable on the open market and are manufactured by the Electric Machinery Mfg. Co. of Minneapolis, Minnesota, and while shown and described herein for the purposes of illustration and description of a complete operative variable speed pumping system, it is to be understood that other applicable variable speed torque transmitters or other applicable electronic controllers than that shown and described, may be employed without departing from the spirit of the invention.

Also, dependent on the speed of the motor, and/or the maximum speed of operation of the pump, the gearing shown at 6 may be employed or eliminated.

The fluid level variance operated control mechanism 30, which operates or moves the arm 22 (Figure 12) of the potentiometer rheostat 20 which adjusts the speed of operation of the pump 1 through the magnetic drive 7 as above described is shown in detail in Figures 2 to 9 inclusive of the drawings.

The control mechanism 30 includes a shaft 31 supported from a suitable pedestal 32 by bearings 33. A sprocket wheel 34 is keyed on the shaft 31 and a sprocket chain 35 passes over the sprocket 34 as clearly shown in Figure 2 of the drawings. The sprocket chain 35 has a counterweight 36 attached to one end thereof and the other end is connected by a suitable coupling 37 on one end of a telescoping rod structure 38. The sections of the telescoping rod structure 38 may be held in adjusted positions by any suitable means.

The lower end of the telescoping rod structure 38 is connected to a float 39 which is located in a float-tube or float well 40. The bottom or open lower end of the float-tube 40 extends into the suction well 3 below the normal level of liquid therein so that variances in the level of liquid in the suction well 3 will move the float 39.

Movement of the float under variances of the liquid level in the suction well 3 will, through the sprocket chain 35 rotate the sprocket wheel 34 and shaft 31. Stop balls 41 are adjustably carried by the sprocket chain 35 and they engage stop members 42, which also serve as guides for the sprocket chain 35, to limit the rotary movement of the sprocket 34.

A potentiometer rheostat arm operating or speed control cam 43 is keyed to the shaft 31 and consequently is rotated by rotation of the shaft 31 and sprocket 34. The cam 43 has a cam groove or cam track 44 in one face thereof which has eccentric variable speed sectors 45 and concentric constant speed sectors 46 at each end of the eccentric variable speed sectors 45 as clearly shown in Figure 9 of the drawings.

Figure 5:
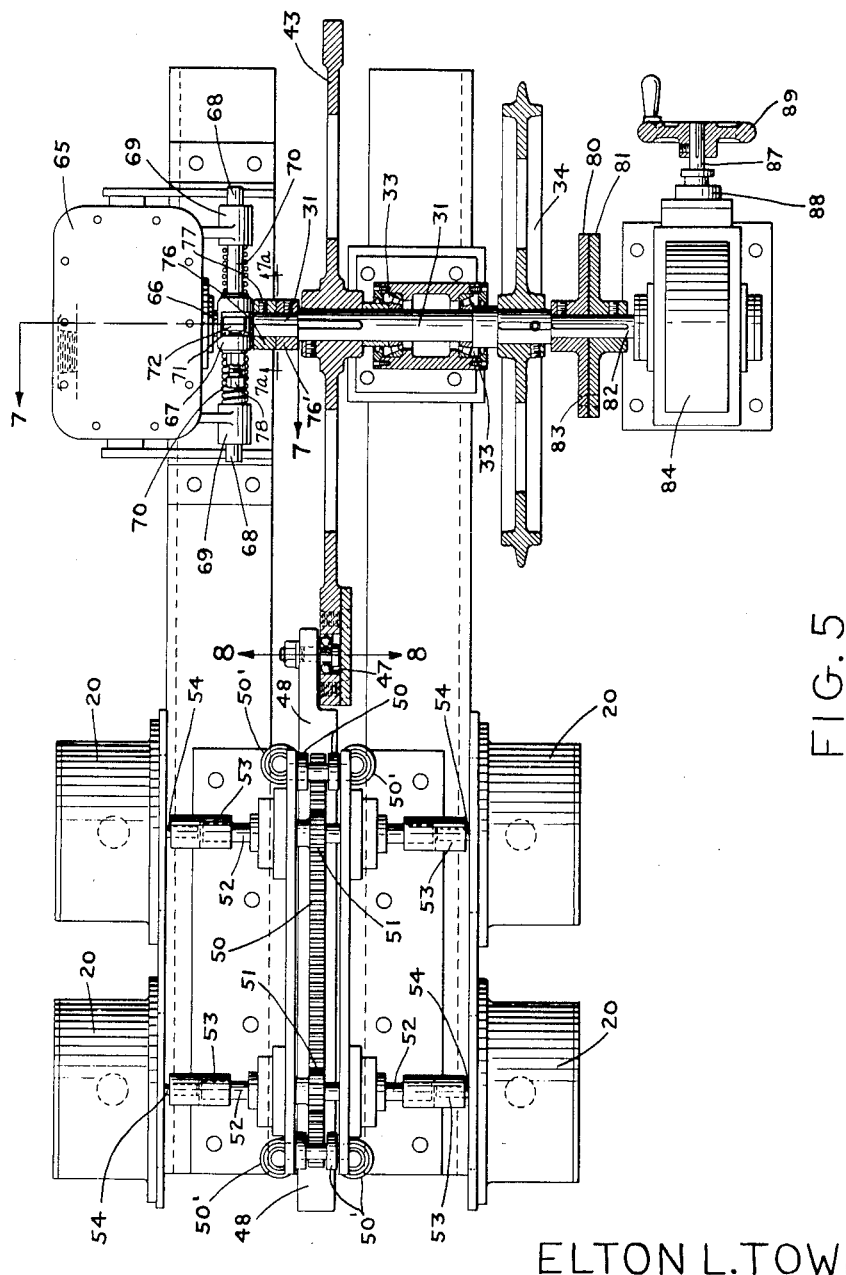
Figure 5 is an enlarged view partly in section and partly in plan of a part of the control mechanism.
Figure 8:
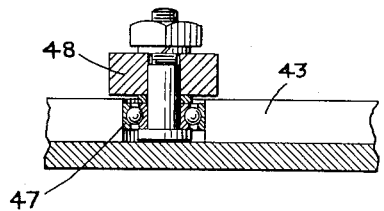
Figure 8 is a detail section taken on line 8—8 of Figure 5.

A cam roller 47, which preferably is of a roller or ball bearing structure as shown in Figures 5 and 8, engages in the cam track 44. The cam roller 47 is attached to one end of a rack bar 48 which is slidably carried by a suitable support 49, and is completely ball bearing mounted, by ball bearings shown at 50', so as to permit free unimpeded sliding movement of the rack bar 48 upon rotation of the cam 44.

A rack 50 is caried by the rack bar 48, moves therewith, and meshes with pinions 51 carried by shafts 52. The shafts 52 are rotatably supported by the support 49 and are connected by suitable couplings 53 to the arm operating pins or shafts 54 of the potentiometer rheostats 20, four of which are shown in Figures 2, 3, 4, and 5 of the drawings.

While four potentiometer rheostats are shown in the drawings, for controlling the speed of four different pumping units, it is to be understood that any number of such rheostats may be employed in connection with the control mechanism 30 depending on the number of pumps or pumping units employed in the system with which the control mechanism is used.

In operation: the float 39 rises and falls with variances in the liquid level in the suction well 3, and such movement moves the sprocket chain 35 within the limits of its movement defined by the position of the adjustable stop balls 41 and stops 42. Movement of the chain 35 rotates the sprocket 34 which in turn rotates the cam 43. When the cam roller 47 is engaged in an eccentric portion of the cam track 44 rotation of the cam will move the rack bar 48, and through the rack 50 and pinions 51 will adjust the arms 22 of the respective rheostats 20, to control or vary the speed of operation of the pumps associated with the respective rheostats in accordance with the variations of the liquid level in the suction well 3, through the excitation of the magnetic drives 7 in the manner heretofore described.

When the cam roller 47 passes from an eccentric portion of the cam track 44 into a concentric portion of the track no motion is transmitted to the rheostat arms 20, and thus when the rheostat arms 20 are in minimum or maximum position, "overtravel" or "undertravel" of the float is permitted without affecting the speed of the pump, and the float may continue following the liquid level up or down, respectively, without altering the speed of rotation of the pump or pumps.

The potentiometer rheostats 20 may be set in any desired manner, within their limits of setting, to control the speeds of the various pumps in the system in any sequence, desired or necessary to provide the proper operation of the pumping system.

By removing the excitation on the magnetic drive 7 of the pumping unit the pump may be stopped, allowing the motor 8 to continue to run. Restoration of the excitation on the magnetic drive 7 will restart the pump. The pumps of a multi-pump-unit system may, therefore, be started and stopped, without having to start and stop the respective motors, under control of the float 39, and through the control mechanism 30 and rheostats 20, to cut in and out the respective pumping units as the quantity of liquid to be pumped dictates, and such pump or pumps as are in operation will have their speed regulated in stepless speed increments over the entire variable speed range, also as variances in the level of liquid to be pumped dictates.

The telescopic tubular connection 38 between the sprocket chain 35 and the float 39 permits an easy adjustment of the float level, without changing the adjustment of the potentiometer rheostats 20 or the control mechanism 30.

One or more adjustable mercury switches are associated with the control mechanism 30 and are operated, in the manner hereinafter described, by rotation of the shaft 31. Such switch or switches establish or break circuits which may be used for purposes of indicating by alarms or lights (not shown) an extreme high or low level through which additional pumping units are started or stopped; or to excite the starting mechanism of these units automatically, or to stop such units. Where the pumping units are all of magnetic drive type such circuits may operate the excitation of the magnetic drives permitting stopping of pumps on extreme low level without stopping the motors. Where some of the units may be of constant speed types, these circuits may be employed for the automatic start or stop of such units at the same time retaining in service the variable speed magnetic drive unit with each combination.

The stepless output cycle of one or more units employing at least one variable speed unit, may be accomplished even though some units are fixed speed type through progressive settings of these switches in the over or under travel zones of the cam 43 movement. Any approved type of alarm or signal, and/or any approved type of cut-off switch or mechanism may be employed in connection with the mercury switch or switches, and therefore such devices are not shown or described herein.

Figure 7A:
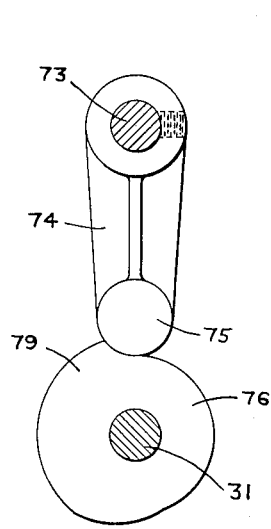
Figure 7a is a detail horizontal section through the control mechanism taken on line 7a—7a of Figure 5.
Figure 7:
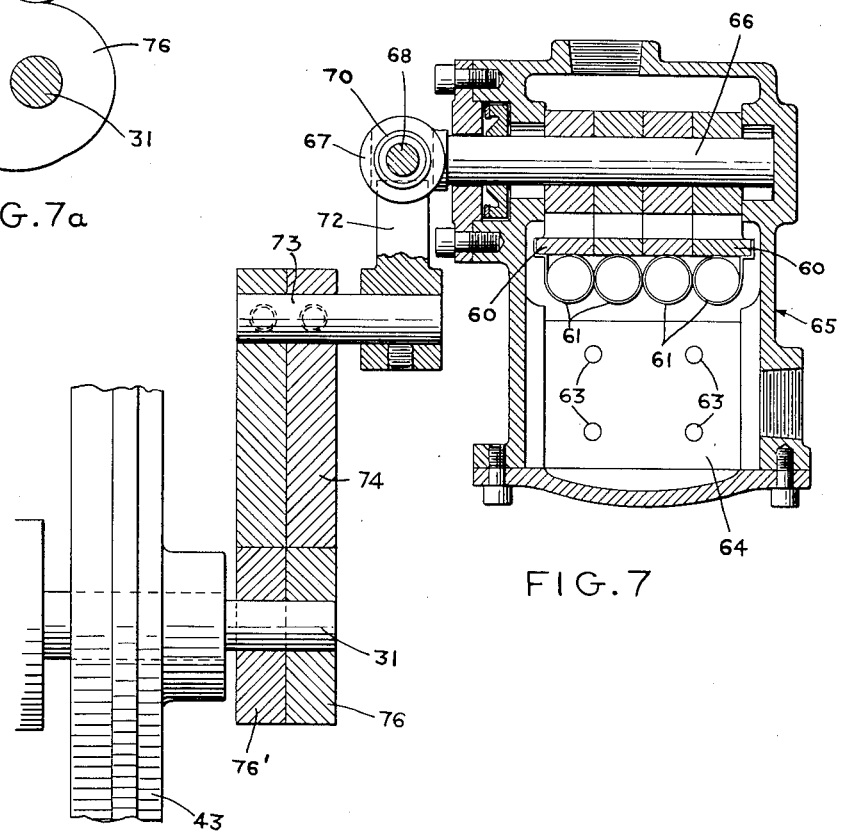
Figure 7 is a fragmentary view partly in section and partly in elevation of the speed control mechanism and taken approximately on line 7—7 of Figure 5.
Figure 9:
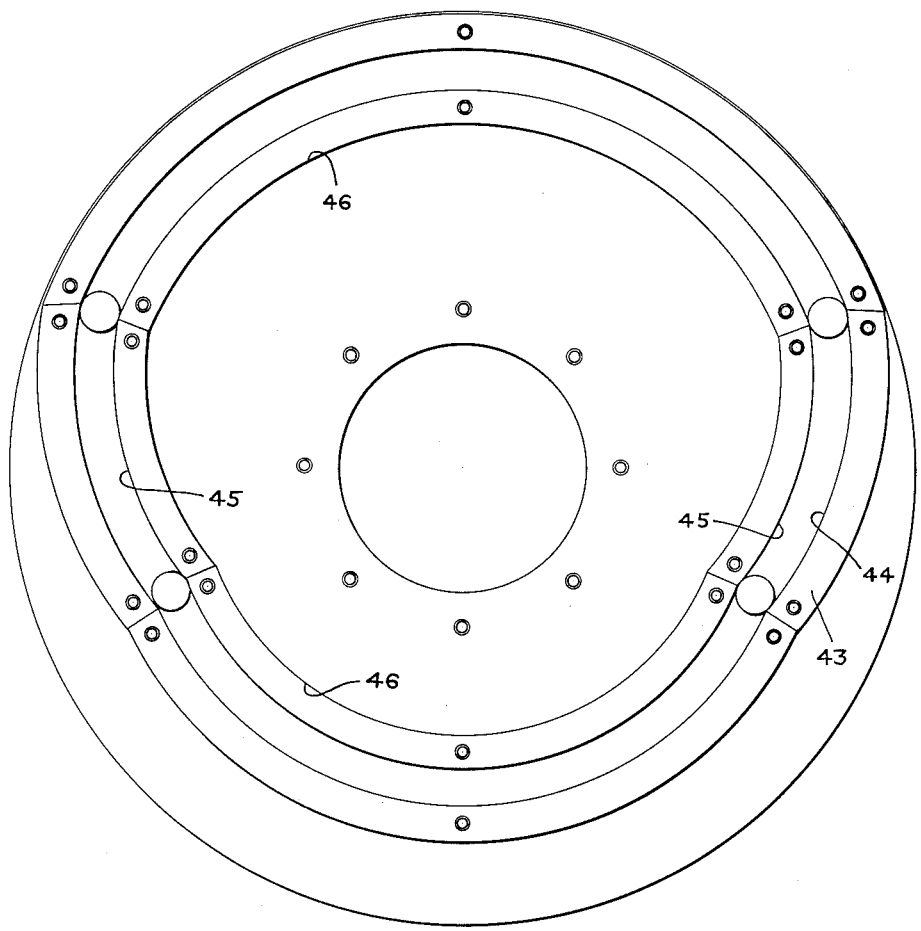
Figure 9 is a plan view of the control or operating cam employed in the speed control mechanism.

The mercury switch structures and their operating mechanism are shown in detail in Figures 7 and 7a of the drawings and include rockable switch supporting platforms or shoes 60 which have mercury switches 61 of ordinary construction, mounted thereon. The mercury switches 61 are electrically connected to terminals 63 carried by a Micarta panel board 64. The electrical circuits go from the terminals 63 to any suitable alarm or signal mechanism (not shown) or to any suitable switch (not shown) as desired and as above referred to.

The switches 61 and the panel board 64 are enclosed in a suitable housing 65, which is supported on the support 30.

A rocker shaft 66 is rockably carried by the housing 65 and has the shoes or platforms 60 mounted thereon for movement with the rocker shaft to operate the switches 61.

The rocker shaft 66 has a yoke 67 thereon to the opposite ends of which are attached guide rods 68. The guide rods 68 are slidably mounted in brackets 69 rigidly supported from the housing 65. Springs 70 are mounted on the guide rods 68 between the yoke 67 and the guide brackets 69 and are tensioned to maintain the yoke 67 centrally in straight position between the brackets 69 and to maintain the shoes or platforms 60 in horizontal position.

The yoke 67 has an opening 71 extending therethrough into which an operating finger 72 extends. The operating finger 72 is carried by a stud 73 which in turn is carried by a cam arm 74. Each of the cam arms 74 have a cam engaging head 75 on its end opposite the end carrying the stud 73. The cam engaging head 75 engages the perimeter of operating cams 76 and 76' mounted on the shaft 31. The cams 76 and 76' are held in adjusted positions on the shaft 31 by set screws 77.

One or more adjustable studs 78 are carried by the yoke 67 for contact with the operating finger 72, and may be adjusted to regulate the degree of lost motion of the operating finger 72, before it starts to move the yoke 67 and rock the shaft 66.

During rotation of the shaft 31 and when the cam head 75 engages the hump or rise 79 of the perimeter of the cam 76, it will move the cam arm 74 in one direction, moving the operating finger 72, which through contact with the stud 78 or the yoke 67 will cause limited movement of the yoke, resulting in rocking movement of the rocker shaft 66, with the resultant movement of the mercury switches 61. When the cam head 75 engages the hump or rise of the cam 76' the operating finger will be moved in the opposite direction resulting in a reversed operation of the rocker shaft 66 and mercury switches 61.

While the cam head 75 is riding over the normal surface of the perimeters of the cams 76 and 76' the operating finger will be in central upright position and the springs 70 will hold the yoke 67 rocker shaft 66 and mercury switches in normal positions to cut off flow of electric current through the switches.

Figure 6:
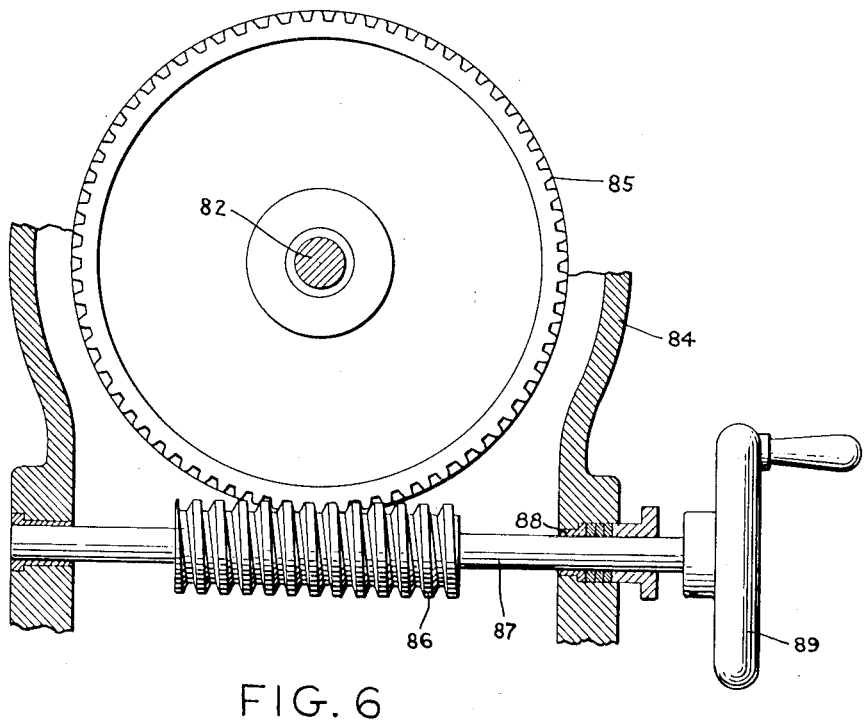
Figure 6 is a detail section of a part of the speed control mechanism taken on line 6—6 of Figure 2.

Means are provided to permit manual operation of the control mechanism 30, such means being clearly illustrated in Figures 5 and 6 of the drawings.

This manual operating means includes a disc coupling section 80 mounted on the shaft 31, which cooperates with a companion disc coupling section 81 carried by a stub shaft 82. The coupling sections 80 and 81 are normally out of cooperating connection and are connected by a taper pin (not shown) which is inserted through the tapered openings 83 in the coupling sections 80 and 81 for connecting them for unitary movement. The stub shaft 82 extends into a housing 84 and has a worm gear 85 mounted on its inner end. The worm gear 85 meshes with a worm 86 carried by a manually rotated shaft 87. The shaft 87 is carried by suitable bearing 88 on the housing 84 and has a hand wheel 89 on its outer end.

When the disc clutch sections 80 and 81 are connected for unitary movement, rotation of the hand wheel 89 will cause rotation of the shaft 31 with consequent operation of the various elements connected to the shaft 31. The worm gearing connecting the shafts 87 and 82 may be a reduction gearing of any desired ratio.

While the control method and apparatus is shown in the drawings as applied to a vertical shaft pumping unit, it is equally adaptable to horizontal shaft pumping units, and in systems employing a plurality of pumps the programming of speed control may be arranged so that with increasing liquid levels in the suction well 3 succeeding pumps will be started and/or speed of the operating pumps increased in any desired sequence, and the sequence of starting and stopping of the pumps may be arranged in different order if desired (for example the pumps may be started in one, two, three order and stopped in two, three, one order).

The starting or speed change of the pump or pumps may be arranged to become effective at various liquid levels in the suction well 3 or at different degrees of variance in the liquid level. All such changes or settings of the apparatus are possible through adjustment of the telescopic tube structure 38, adjustment of the potentiometer rheostats, and the various other setting adjustments provided for as hereinabove described.

It will be understood that the invention is not to be limited to the specific construction or arrangement of parts shown, but that they may be widely modified within the invention defined by the claims.

What is claimed is:

1. In an automatic variable speed control for pumping units, the combination with a centrifugal pump, a constant speed driving motor therefor, and a magnetic drive operatively connecting the motor and pump whereby excitation of said magnetic drive will cause said pump to be driven at various speeds while the motor operates at constant speed, of means for controlling the speed of operation of the pump including, means for regulating the excitation of said magnetic drive, a cam for controlling operation of said regulating means, said cam having eccentric and concentric operating surfaces whereby during predetermined periods of rotation of the cam said regulating means will be ineffective for varying the excitation of said magnetic drive and during other predetermined periods of rotation of the cam the regulating means will be effective for varying the excitation of said magnetic drive, and means for actuating said cam operated by variances in the level of the liquid to be pumped.

2. In an automatic variable speed control for pumping units, the combination as claimed in claim 1 wherein said cam operated means includes a potentiometer rheostat for controlling the excitation of said magnetic drive, and means operated by the cam for changing the setting of said potentiometer rheostat.

3. In an automatic variable speed control for pumping units, the combination as claimed in claim 1 wherein said cam operated means includes a rack connected to and movable with said cam, an electric current control device for controlling excitation of said magnetic drive, and means connecting said rack and said electric current controlling device to operate the latter upon movement of the rack.

4. In an automatic variable speed control for pumping units, the combination as claimed in claim 1 including manually operated means normally out of operative connection with said cam, and means for connecting said manually operated means and said cam to permit manual operation of the cam.

5. In an automatic variable speed control for pumping units, the combination as claimed in claim 1 wherein said cam operated means includes a potentiometer rheostat for controlling the excitation of said magnetic drive, and means operated by the cam for changing the setting of said potentiometer rheostat, and manually operated means normally out of operative connection with said cam, and means for connecting said manually operated means and said cam to permit manual operation of the cam.

6. In an automatic variable speed control for pumping units, the combination as claimed in claim 1 wherein said cam operated means includes a rack connected to and movable with said cam, an electric current control device for controlling excitation of said magnetic drive, and means connecting said rack and said electric current control device to operate the latter upon movement of the rack, and manually operated means normally out of operative connection with said cam, and means for connecting said manually operated means and said cam to permit manual operation of the cam.

7. In an automatic variable speed control for pumping units, the combination as claimed in claim 1 and wherein said means operated by variances in the level of liquid to be pumped includes, a rotary element connected to said cam, a float movable by variances in the liquid level, and flexible means connecting said float and rotary element to rotate the rotary element upon movement of the float.

8. In an automatic variable speed control for pumping units, the combination as claimed in claim 1 wherein said means operated by variances in the level of liquid to be pumped includes, a rotary element connected to said cam, a float movable by variances in the liquid level, and flexible means connecting said float and rotary element to rotate the rotary element upon movement of the float, and adjustable stop means for limiting the movement of said flexible means and the consequent rotation of said rotary element.

9. In an automatic variable speed control for pumping units, the combination as claimed in claim 1 wherein said means operated by variances in the level of liquid to be pumped includes, a rotary element connected to said cam, a float movable by variances in the liquid level, and flexible means connecting said float and rotary element to rotate the rotary element upon movement of the float, and adjustable means for varying the distance of said float from said rotary element to vary the degree of relative movement of the float and rotary element upon predetermined variances in liquid level.

10. In an automatic variable speed control for pumping units, the combination as claimed in claim 1 wherein said cam operated means includes a potentiometer rheostat for controlling the excitation of said magnetic drive, and means operated by the cam for changing the setting of said potentiometer rheostat and wherein said means operated by variances in the level of liquid to be pumped includes, a rotary element connected to said cam, a float movable by variances in the liquid level, and flexible means connecting said float and rotary element to rotate the rotary element upon movement of the float.

11. In an automatic variable speed control for pumping units, the combination as claimed in claim 1 wherein said cam operated means includes a rack connected to and movable with said cam, an electric current control device for controlling excitation of said magnetic drive, and means connecting said rack and said electric current control device to operate the latter upon movement of the rack and wherein said means operated by variances in the level of liquid to be pumped includes, a rotary element connected to said cam, a float movable by variances in the liquid level, and flexible means connecting said float and rotary element to rotate the rotary element upon movement of the float.

12. In an automatic variable speed control for pumping units, the combination as claimed in claim 1 wherein said cam operated means includes a potentiometer rheostat for controlling the excitation of said magnetic drive, and means operated by the cam for changing the setting of said potentiometer rheostat and wherein said means operated by variances in the level of liquid to be pumped includes, a rotary element connected to said cam, a float movable by variances in the liquid level, and flexible means connecting said float and rotary element to rotate the rotary element upon movement of the float, and adjustable means for varying the distance of said float from said rotary element to vary the degree of relative movement of the float and rotary element upon predetermined variances in liquid level.

13. In an automatic variable speed control for pumping units, the combination as claimed in claim 1 wherein said cam operated means includes a rack connected to and movable with said cam, an electric current control device for controlling excitation of said magnetic drive, and means connecting said rack and said electric current control device to operate the latter upon movement of the rack, and manually operated means normally out of operative connection with said cam, and means for connecting said manually operated means and said cam to permit manual operation of the cam, and wherein said means operated by variances in the level of the liquid to be pumped includes, a rotary element connected to said cam, a float movable by variances in the liquid level, and flexible means connecting said float and rotary element to rotate the rotary element upon movement of the float and adjustable stop means for limiting the movement of said flexible means and the consequent rotation of said rotary element, and adjustable means for varying the distance of said float from said rotary element to vary the degree of relative movement of the float and rotary element upon predetermined variances in liquid level.

14. In an automatic variable speed control for pumping units, the combination as claimed in claim 1 including a mercury switch connected to said magnetic drive to stop and start said pump, cams operated by said first cam operating means for operating said mercury switch in accordance with predetermined variances of the liquid level.

15. In an automatic variable speed control for pumping units, the combination with a centrifugal pump, a driving motor therefor and a flexible torque transmitter operatively connecting the pump and motor whereby the pump may be driven at various speeds while the motor operates at constant speed, said torque transmitter embodying a driving element and a driven element, of means controlling the speed of operation of the pump including means for regulating the speed at which the driven element of the torque transmitter is driven by its driving element, a cam for controlling operation of said speed regulating means, said cam having eccentric and concentric operating surfaces whereby during predetermined periods of operation of the cam said speed regualting means will be ineffective for varying the speed at which the driven element of the torque transmitter is driven by its driving element and at other predetermined periods of operation of the cam will be effective to vary the speed at which the driven element of the torque transmitter is driven by its driving element, and means operated by variances in the level of liquid to be pumped for operating said cam.

16. In an automatic variable speed control for pumping units, the combination as claimed in claim 15 including manually operated means normally out of connection with said cam, and means for connecting said manually operated means and said cam to permit manual operation of the cam.

17. In the combination as claimed in claim 15 wherein said means operated by variances in the level of the liquid to be pumped includes, a rotary element connected to and rotatable with said cam, a float movable by variances in the liquid level, and flexible means connecting said float and rotary element to rotate the rotary element on movement of the float.

18. In an automatic variable speed control for pumping units, the combination as claimed in claim 17 including adjustable stop means for limiting the movement of said flexible means and the consequent rotation of said rotary element.

19. In an automatic variable speed control for pumping units, the combination as claimed in claim 17 including adjustable means for varying the distance of said float from said rotary element to vary the degree of relative movement of the float and rotary element upon predetermined variances in the level of liquid to be pumped.

20. In an automatic variable speed control for pumping units, the combination with a centrifugal pump, a constant speed driving motor therefor, and a magnetic drive operatively connecting the motor and pump whereby excitation of said magnetic drive will cause said pump to be driven at various speeds while the motor operates at constant speed, of means for controlling the speed of operation of the pump including, means for regulating the excitation of said magnetic drive, a cam for controlling operation of said regulating means, said cam having eccentric and concentric operating surfaces whereby during predetermined periods of rotation of the cam said regulating means will be ineffective for varying the excitation of said magnetic drive and during other predetermined periods of rotation of the cam the regulating means will be effective for varying the excitation of said magnetic drive, means for actuating said cam operated by variances in the level of the liquid to be pumped, and switch means connected to said magnetic drive and actuated by said means responsive to variations in the liquid level to start and stop said pumping units in accordance with predetermined variations in the liquid level to be maintained.

21. In the combination as claimed in claim 20 wherein said switch means includes a mercury switch connected to said regulating means, a cam operated by said first cam operating means for operating said mercury switch in one direction, and another cam operated by said first cam operating means for moving the mercury switch in the reverse direction, and means for normally maintaining said mercury switch in a non-operating position.

22. In an automatic variable speed control for pumping units, the combination with a centrifugal pump, a driving motor therefor and a flexible torque transmitter operatively connecting the pump and motor whereby the pump may be driven at various speeds while the motor operates at constant speed, said torque transmitter embodying a driving element and a driven element, of means controlling the speed of operation of the pump including means for regulating the speed at which the driven element of the torque transmitter is driven by its driving element, a cam for controlling operation of said speed regulating means, said cam having eccentric and concentric operating surfaces whereby during predetermined periods of operation of the cam said speed regulating means will be ineffective for varying the speed at which the driven element of the torque transmitter is driven by its driving element and at other predetermined periods of operation of the cam will be effective to vary the speed at which the driven element of the torque transmitter is driven by its driving element, a rotary element connected to said cam, a float movable by variances in the level of the liquid to be pumped, and flexible means connecting said float and rotary element to rotate the rotary element upon movement of the float, a mercury switch for starting and stopping said pumping units, a cam operated by said rotary element for moving said mercury switch in one direction, and a second cam operated by rotation of said rotary element for moving the mercury switch in the opposite direction whereby said pumping units will be placed in operation in accordance with the required conditions.

23. In the combination as claimed in claim 20 wherein said switch means coacts with said cam to operate at the outer limits of the ineffective periods of operation of said cam.

References Cited in the file of this patent

UNITED STATES PATENTS

| | | |
|---|---|---|
| 414,191 | Conant | Nov. 5, 1889 |
| 485,221 | Pocock | Nov. 1, 1892 |
| 762,620 | Eastwood | June 14, 1904 |
| 841,270 | Potter | Jan. 15, 1907 |
| 872,298 | Leonard | Nov. 26, 1907 |
| 998,647 | Smith | July 25, 1911 |
| 1,411,145 | Whitted | Mar. 28, 1922 |
| 1,444,914 | Harvey et al. | Feb. 13, 1923 |
| 1,448,401 | Harvey | May 13, 1923 |
| 1,811,952 | Merritt | June 30, 1931 |
| 2,219,472 | Defandorf et al. | Oct. 29, 1940 |
| 2,276,794 | Ricci | Mar. 17, 1942 |
| 2,292,349 | Bennett | Aug. 11, 1942 |